(12) United States Patent
Li

(10) Patent No.: US 12,336,662 B2
(45) Date of Patent: Jun. 24, 2025

(54) TEA DRINKING VACUUM FLASK WITH TEA-MAKING FUNCTION

(71) Applicant: Mungyuen Li, Kowloon (HK)

(72) Inventor: Mungyuen Li, Kowloon (HK)

( * ) Notice: Subject to any disclaimer, the term of this patent is extended or adjusted under 35 U.S.C. 154(b) by 938 days.

(21) Appl. No.: 17/483,804

(22) Filed: Sep. 24, 2021

(65) Prior Publication Data
US 2022/0095838 A1    Mar. 31, 2022

(30) Foreign Application Priority Data

Sep. 25, 2020 (CN) .......................... 202022137839.3

(51) Int. Cl.
*A47J 41/02*     (2006.01)
*A47J 31/06*     (2006.01)

(52) U.S. Cl.
CPC ........... *A47J 41/02* (2013.01); *A47J 31/0626* (2013.01); *A47J 31/0636* (2013.01)

(58) Field of Classification Search
CPC .......................... A47J 31/0626; A47J 31/0636
See application file for complete search history.

(56) References Cited

U.S. PATENT DOCUMENTS

| | | |
|---|---|---|
| 9,801,492 B1 | 10/2017 | Lin |
| 2009/0178573 A1 | 7/2009 | Pan |
| 2013/0206717 A1* | 8/2013 | Lane .................. A47J 31/0636 |
| | | 220/521 |

FOREIGN PATENT DOCUMENTS

| | | | |
|---|---|---|---|
| EP | 2749191 A1 * | 7/2014 | .......... A47J 31/0636 |
| WO | 2011105416 A1 | 9/2011 | |

OTHER PUBLICATIONS

Extended European Search Report issued by Examiner Romain Lebalnc, of the European Patent Office, dated Feb. 28, 2022, in corresponding European Patent Application No. 21198793.8.

* cited by examiner

*Primary Examiner* — Elizabeth M Kerr
(74) *Attorney, Agent, or Firm* — Troutman Pepper Locke LLP; Gabrielle L. Gelozin

(57) ABSTRACT

A tea drinking vacuum flask includes a lid body, a connecting piece, a filtering element, and a liquid containing body. The lid body comprises a first end and a first open end arranged opposite to the first end. The connecting piece comprises a channel having a first connection end and a second connection end. The first connection end is detachably connected with the first open end. The filtering element comprises first and second parts fixedly connected with each other. The first part is positioned at the end, facing the lid body, of the second part. Open slots are formed in the first part. Filtering holes are formed in the second part. Flow areas of open slots are different from those of filtering holes. The filtering element is detachably connected with the connecting piece. The liquid containing body is detachably connected with the second connection end of the connecting piece.

20 Claims, 9 Drawing Sheets

TEA DRINKING VACUUM FLASK WITH TEA-MAKING FUNCTION

CROSS-REFERENCE TO RELATED APPLICATION

This non-provisional application claims priority to and benefit of, under 35 U.S.C. § 119(a), Patent Application No. 2020022137839.3 filed in P.R. China on Sep. 25, 2020, the entire contents of which are hereby incorporated by reference in their entirety.

FIELD

The present disclosure relates to the field of drinkware, and more particularly relates to a tea drinking vacuum flask with a tea-making function.

BACKGROUND

In daily life, tea drinking is becoming more and more common. There are many ways to make tea, such as using special tea-making tools. The inventor found that these tea-making tools have a large volume and many parts, thus being inconvenient to carry when going out.

The existing portable vacuum flask comprises a vacuum flask body and a vacuum flask lid. The vacuum flask comprises a through cavity. The vacuum flask lid is buckled with the vacuum flask body or is detachably connected with the vacuum flask body by other structures. A filter is arranged inside the vacuum flask body for storing tea leaves in a tea-making process and separating the tea leaves when tea water is poured.

The inventor found that for the existing portable vacuum flask (or called water bottle), in the tea-making process, some tea water remains on the top of the vacuum flask due to the vacuum formed on the top of the vacuum flask. When a user opens the vacuum flask, the retained tea water will immediately pour down, so that an unaware user is prone to be scalded.

SUMMARY

The embodiments of the present disclosure provide a tea drinking vacuum flask with a tea-making function, which is used for optimizing the structures and functions of tea drinking vacuum flasks with a tea-making function.

Some embodiments of the present disclosure provide a tea drinking vacuum flask with a tea-making function, comprising:
  a lid body which comprises a first end and a first open end arranged opposite to the first end;
  a connecting piece which comprises a channel, wherein the channel comprises a first connection end and a second connection end; and the first connection end is detachably connected with the first open end;
  a filtering element which comprises a first part and a second part which are fixedly connected with each other, wherein the first part is positioned at the end, facing the lid body, of the second part; open slots are formed in the first part, filtering holes are formed in the second part, and flow areas of the open slots are different from those of the filtering holes; and the filtering element is detachably connected with the connecting piece; and
  a liquid containing body which is detachably connected with the second connection end of the connecting piece.

In some embodiments, the shapes of the open slots are selected from one or more of the following shapes: a circle, a U shape, an oblong shape, a herringbone shape, a rectangle, a wavy shape, and a polygon.

In some embodiments, the flow area of the single open slot is greater than that of the single filtering hole.

In some embodiments, elastic clamp holders are arranged on the outer wall of the first part of the filtering element.

In some embodiments, the elastic clamp holders are constructed to be arcuate bulges.

In some embodiments, at least one open slot is formed along the circumferential direction of the first part of the filtering element.

In some embodiments, the diameter of the first part of the filtering element is greater than that of the second part of the filtering element.

In some embodiments, a plurality of rows of the filtering holes are formed along the generatrix direction of the wall body of the filtering element.

In some embodiments, the lid body comprises:
  a flip lid; and
  a filter component arranged at the bottom of the flip lid.

In some embodiments, the connecting piece is integrated with one of the lid body and the liquid containing body, and/or the liquid containing body comprises an outer shell and an inner liner fixed in the outer shell; and/or the first part is integrated or detachably connected with the second part.

According to the tea drinking vacuum flask with a tea-making function of the technical solution above, the filtering element is installed in the connecting piece. The filtering element is divided into two parts: the first part and the second part. The first part and the second part are both provided with structures that allow the flow of fluid or gas; and specifically, open slots are formed in the first part, and filtering holes are formed in the second part. The flow area of the single open slot is much greater than that of the single filtering hole. The flow area of the single open slot is 1.5-100 times, which is preferably 3-80 times or more preferably 5-60 times, that of the single filtering hole. With this design, when liquid flows through the filtering element, the air flow flows, through the open slots, from the area under the filtering element of the tea drinking vacuum flask with a tea-making function to the area above the filtering element, so that the formation of a vacuum state in the lid body of the tea drinking vacuum flask with a tea-making function is avoided, the tea water is enabled to smoothly flow down into the liquid containing body through the filtering element, the problem of tea water retaining in the lid body of the tea drinking vacuum flask with a tea-making function is thus solved, and the user is further prevented from being scalded.

In the absence of the open slots, due to the vacuum formed in the upper area of the tea drinking vacuum flask with a tea-making function and the water surface tension on the surfaces of the filtering holes, it is very easy for the liquid to fail to pass through the filtering holes freely and further cause blockage under the action of these two forces. In order to solve the problem in the absence of the open slots, it is necessary to design filtering holes with large diameters (the hole diameter is usually 1-2 mm), so that the air is enabled to flow, through the filtering holes, from the area under the filtering element to the area above the filtering element while the liquid flows down through the filtering holes, thus avoiding liquid blockage. However, the increase in sizes of the filtering holes in this design will seriously affect the filtering effect of tea leaf and water separation, allowing fine tea leaves to flow freely through the filtering holes. In the technical solution of the present disclosure, since the open slots are designed in the filtering element, the filtering element has a function of separating the air flow and the liquid flow in the vacuum flask. It can be seen from the technical solution that there is no vacuum formed in the vacuum flask lid and the connecting piece, so that the filtering holes formed in the side wall and the bottom wall of the filtering element can be designed to have small hole diameters of, for example, 0.2-0.8 mm, and there will be no vacuum to store tea water, which can improve the effect of tea leaf and water separation, and further effectively and perfectly solves the conflict and problems above.

BRIEF DESCRIPTION OF THE DRAWINGS

The drawings described here are used to provide a further understanding of the present disclosure and constitute a part of the present application. The exemplary embodiments of the present disclosure and the description thereof are used to explain the present disclosure, and do not constitute an improper limitation on the present disclosure. In the drawings.

DETAILED DESCRIPTION

Figure 1:
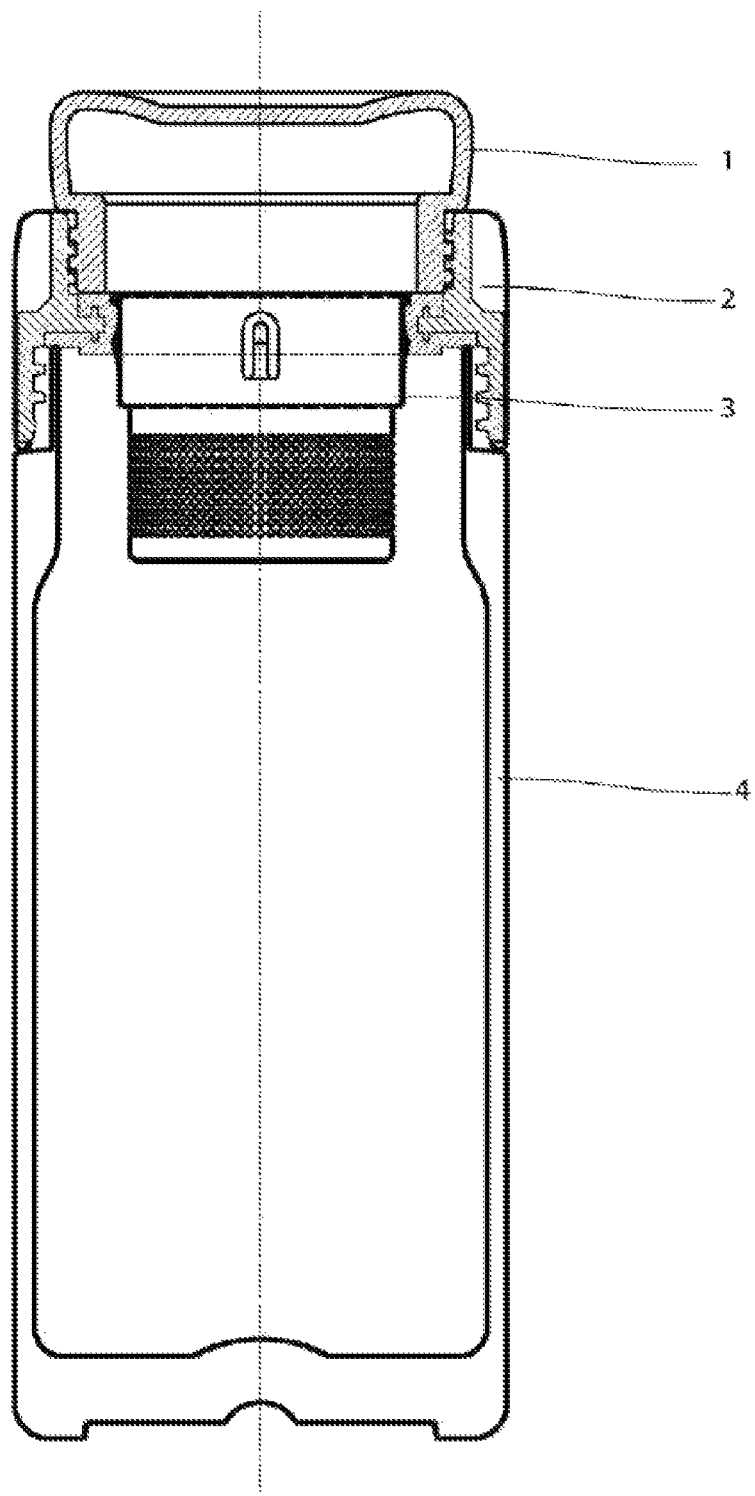
FIG. 1 is a schematic section view of a tea drinking vacuum flask with a tea-making function of some embodiments of the present disclosure.

The technical solution of the present disclosure will be described in more detail below in combination with FIGS. 1-18.

The inventor found that for the existing portable vacuum flask (or called water bottle), in the tea-making process, tea water remains at an upper vacuum flask lid part and a tea infuser part due to the vacuum easily formed at the upper section of the vacuum flask or the upper vacuum flask lid. When a user opens the vacuum flask, the retained tea water immediately pours down and is prone to spilling out, causing the user to be scalded.

Specifically, after a tea drinking vacuum flask with a tea-making function is assembled, the water and air inside the vacuum flask are isolated from the outside world. The inventor found that when the tea drinking vacuum flask with a tea-making function is in use, the problem of tea water being blocked in a tea leaf filter cavity on the top of the upper section of the vacuum flask is likely to occur. The inventor has analyzed and thought deeply and found that the reason for this problem is as follows: when flowing from the vacuum flask lid part, that is, the upper section of the vacuum flask to the liquid containing body through the filtering element, the water sinks under the action of gravity, so that a new layer of space naturally forms on the top (that is, the vacuum flask lid part) of the tea drinking vacuum flask with a tea-making function; and the space is similar to a vacuum space. Therefore, the air pressure in the head space is very low, which causes the liquid in the lid body and the connecting piece to stop flowing downwards; and the tea water stays in the lid body and the connecting piece, thereby preventing the free flow of liquid and affecting the separation of the tea leaves and the tea water. What is particularly serious is that when an unaware user opens the vacuum flask (bottle), the liquid retained in the lid body and the connecting piece will suddenly pour down, and the user will be scalded due to the spilling of the tea water. After repeated research and experiments, the inventor found that the retention of liquid at the upper vacuum flask lid part and the tea infuser part is caused by the vacuum formed at the upper section of the vacuum flask or the upper vacuum flask lid. Therefore, the inventor of the present disclosure adopts a method of designing open slots in the upper end of the filter to guide the airflow, which reduces or even avoids the formation of vacuum mentioned above. The technical solution of the embodiments of the present disclosure is described in detail below.

Referring to FIGS. 1-16, the embodiments of the present disclosure provide a tea drinking vacuum flask with a tea-making function, which comprises a lid body 1, a connecting piece 2, a filtering element 3, and a liquid containing body 4. The lid body 1 is constructed to be openable and is detachably connected with the connected piece 2. The lid body 1 comprises a first end 27 and a first open end 29 arranged opposite to the first end 27. The connecting piece 2 comprises a channel 36, and the channel 36 comprises a first connection end 30 and a second connection end 31; and the first connection end 30 is detachably connected with the first open end 29. The liquid containing body 4 is detachably connected with the connecting piece 2. The filtering element 3 is positioned in the connecting piece 2 and is detachably connected with the connecting piece 2. The filtering element 3 comprises a first part 11 and a second part 12 which are fixedly connected with each other, wherein the first part 11 is positioned at the side, facing the lid body 1, of the second part 12. Open slots 13 are formed in the first part 11, and filtering holes 15 are formed in the second part 12. Flow areas of the open slots 13 are different from those of the filtering holes 15.

In some embodiments, the flow area of the single open slot 13 is greater than that of the single filtering hole 15.

In some embodiments, the liquid containing body 4 is provided with an outer shell 9 and an inner liner 10.

In some embodiments, the open slots 13 are constructed into one or more of the following shapes: a circle, a U shape, an oblong shape, a herringbone shape, a rectangle, a wavy shape, and a polygon. After being constructed to be circular, U-shaped, oblong, and herringbone, the open slots 13 have the advantage that the slot diameters are large, so that air flow is facilitated. The polygonal open slots may be specifically in an S shape, a Y shape, an L shape, etc.

In some embodiments, the open slots 13 are configured to be any combination of more than one of the shapes, such as a combination of a U-shaped slot and a wavy slot.

In some embodiments, elastic clamp holders 14 are arranged on the outer wall of the filtering element 3; the elastic clamp holders 14 are positioned in the open slots 13; and a U-shaped or rectangular groove is formed by the edges of the elastic clamp holders 14 and the edges of the open slots 13. The edge of the filtering element 3 is fixed on a silica-gel water sealing part 8 at a protruding part of the connecting piece 2, and the filtering element 3 is fixed on the silica-gel water sealing part 8 by the elastic clamp holders 14 and the silica-gel water sealing part together, so that the filtering element 3 is prevented from falling off when the vacuum flask is used upside down.

In some embodiments, the elastic clamp holders 14 are configured as strips, at least one side of each elastic clamp holder 14 is connected with the filtering element 3, and the middle parts of the elastic clamp holders 14 protrude towards a position away from the center of the filtering element 3. The elastic clamp holders 14 are upright protruding pieces, which are constructed to have arcuate bulges at the waists. The filtering element 3 is fixed on the silica-gel water sealing part 8 by utilizing the elastic force of the arcuate bulges of the elastic clamp holders 14. The silica-gel water sealing part also has a certain elasticity to cooperate with the elastic clamp holders 14, so that the filtering element 3 can be properly stuck and will not fall off by itself; but the filtering element 3 is detachable.

In some embodiments, the elastic clamp holders 14 are arranged on the outer wall of the filtering element 3; and the elastic clamp holders 14 and the open slots 13 are separable and independent of each other. The elastic clamp holders 14 are constructed as points, and the middle parts of the elastic clamp holders 14 protrude towards a position away from the center of the filtering element. The elastic clamp holders 14 can be upright protruding points, which are constructed to have arcuate bulges at the waists.

In some embodiments, one or more open slots 13 are formed along the circumferential direction of the filtering element 3. For instance, three, four, or more open slots 13 are formed in one circle along the circumferential direction of the filtering element 3.

In some embodiments, one or more elastic clamp holders 14 are arranged along the circumferential direction of the filtering element 3. For instance, three, 2-8 elastic clamp holders 14 are arranged in one circle along the circumferential direction of the filtering element 3, and specifically, 2-4 elastic clamp holders 14 may be arranged.

In some embodiments, the diameter of the first part 11 of the filtering element 3 is larger than that of the second part 12 of the filtering element 3. The entire filtering element 3 has a large upper open end and a small lower end, namely, the size of the second part 12 is smaller, so that the diameter of the lower section of the filtering element 3 can be reduced, liquid flows downward through the filtering holes 15 at a higher speed, and the efficiency of tea leaf and water separation is further increased. The manufacturing structure of the filtering element 3 is divided into the first part 11 and the second part 12. By adopting the modular design of a filter assembly, common parts can be used for filtering elements 3 with various diameters, shapes, and diameters of filtering holes 15, thereby improving manufacturing efficiency and reducing material costs.

In some embodiments, the first part 11 and second part 12 of the filtering element 3 are constructed into an integrated structure.

In some embodiments, the first part 11 and second part 12 of the filtering element 3 are constructed into a detachable structure.

In some embodiments, the first part 11 and the connecting piece 2 of the filtering element 3 are constructed into an integrated structure. The second part 12 of the filtering element 3 is provided with the elastic clamp holders 14. The elastic clamp holders 14 are constructed as point-shaped bulges and are detachably connected with the open slots 13 formed in the outer wall of the first part 11. By adopting the design, the problem that a user must open the lid body 1 to load tea leaves or other materials to be soaked is avoided; and furthermore, the lid body 1 and the connecting piece 2 can be made into an integral structure, so that the number of parts used for the tea drinking vacuum flask with a tea-making function is decreased.

In some embodiments, a fluid blocking part 17 is arranged inside the filtering element 3, and specifically, for example, the fluid blocking part can be a step. The function of the fluid blocking part 17 is that when liquid flows across the step at the junction of the first part 11 and the second part 12 of the filtering element, the fluid velocity slows down while part of the fluid hits the blocking part 17 so as to form a vortex and further generate water bubbles. Due to the formation of the vortex, air entrainment is promoted, and the air is helped to circulate through the open slots 13.

In some embodiments, the filtering holes 15 are distributed in at least one wall body of the filtering element 3.

In some embodiments, the filtering holes 15 are distributed in the side wall and bottom wall of the filtering element 3. The filtering holes 15 are designed as follows: the diameters of the filtering holes 15 distributed in the side wall body are larger than those of the filtering holes 15 distributed in the bottom wall face.

Figure 2:
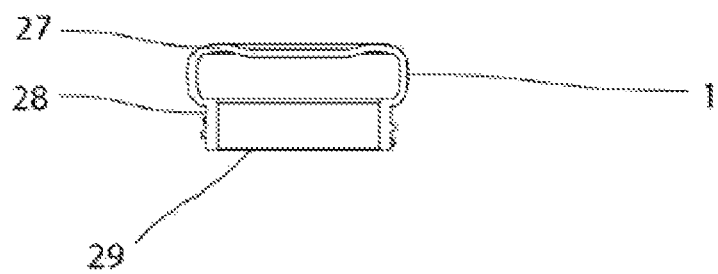
FIG. 2 is a schematic diagram of a lid body structure of a tea drinking vacuum flask with a tea-making function of some embodiments of the present disclosure.

Referring to FIG. 2, the lid body 1 can be made of glass or stainless steel. When the lid body 1 is made of a transparent material, a user can see the color of the liquid in the vacuum flask through the lid body 1 and judge whether the concentration has reached the requirement. The lid body 1 is provided with lid body threads 28 for facilitating the detachable connection with the connecting piece 2.

Figure 3:
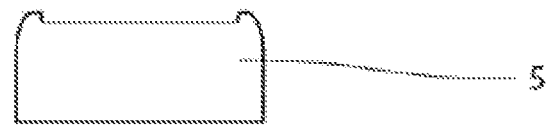
FIG. 3 is a schematic diagram of an outer shell structure of a connecting piece of a tea drinking vacuum flask with a tea-making function of some embodiments of the present disclosure.

Referring to FIG. 3, in some embodiments, the connecting piece 2 is provided with a connecting piece housing 5, an internal inert 6, and an embedded part 7. The connecting piece housing 5 is constructed to be cylindrical and comprises a hollow channel as well as an upper open end and a lower open end. The connecting piece housing 5 is positioned at the outer side of the connecting piece 2, and the inner diameter of the connecting piece housing 5 is greater than those of the internal inert 6 and the embedded part 7, so that the internal inert 6 and the embedded part 7 can be fixedly installed in the connecting piece housing 5 and combined to form the connecting piece 2.

Figure 4:
FIG. 4 is a schematic diagram of an internal insert structure of a tea drinking vacuum flask with a tea-making function of some embodiments of the present disclosure.

Referring to FIG. 4, in some embodiments, the internal insert 6 is constructed to be cylindrical and comprises a hollow channel as well as an upper open end and a lower open end. The internal insert 6 is positioned in the middle of the inner side of the connecting piece 2, and the inner diameter of the internal insert 6 is greater than that of the embedded part 7, so that the embedded part 7 can be fixedly installed at the inner side of the internal insert 6.

Figure 5:
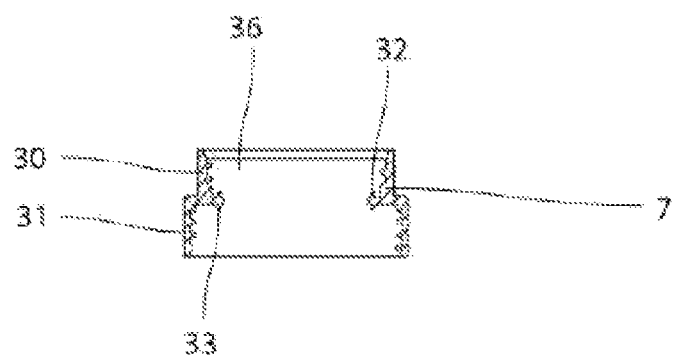
FIG. 5 is a schematic diagram of an embedded part structure of a tea drinking vacuum flask with a tea-making function of some embodiments of the present disclosure.
Figure 6:
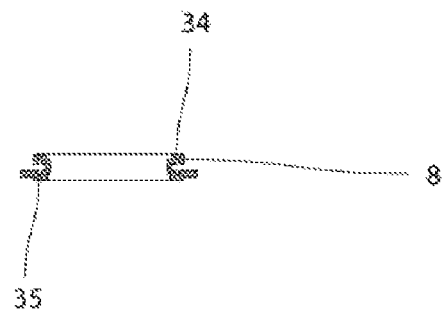
FIG. 6 is a schematic diagram of a water sealing part structure of a tea drinking vacuum flask with a tea-making function of some embodiments of the present disclosure.

Referring to FIG. 5, in some embodiments, the connecting piece 2 is provided with an embedded part 7. The embedded part 7 comprises a channel 36, a first connection end 30, a second connection end 31, a first bulge 32, and a second bulge 33. The first connection end 30 and the second connection end 31 are constructed to have threads and are separately detachably connected with the lid body 1 and the liquid containing body 4. The first bulge 32 and the second bulge 33 are separately connected with a first recess part 34 and a second recess part 35 of the water sealing part 8 in a matching way (referring to FIGS. 6 and 16) so as to enable the water sealing part to be fixedly installed in the embedded part 7. The function of the first bulge 32 and the second bulge 33 is to fix the water sealing part 8 in the embedded part 7 when the filtering element 3 is being installed, thus preventing the water sealing part 8 from deforming or falling off, and improving the sealing effect of the water sealing part 8.

Figure 7:
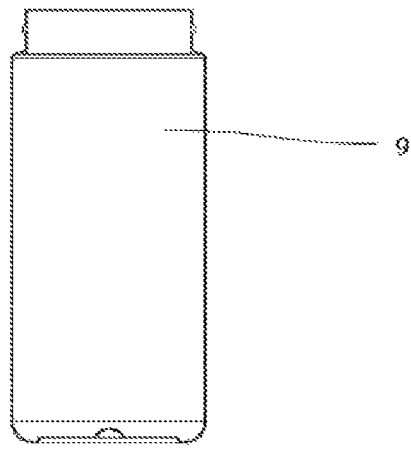
FIG. 7 is a schematic diagram of an outer shell structure of a tea drinking vacuum flask with a tea-making function of some embodiments of the present disclosure.
Figure 8:
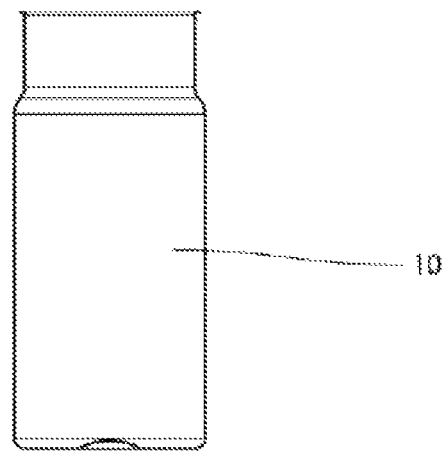
FIG. 8 is a schematic diagram of an inner liner structure of a tea drinking vacuum flask with a tea-making function of some embodiments of the present disclosure.
Figure 9:
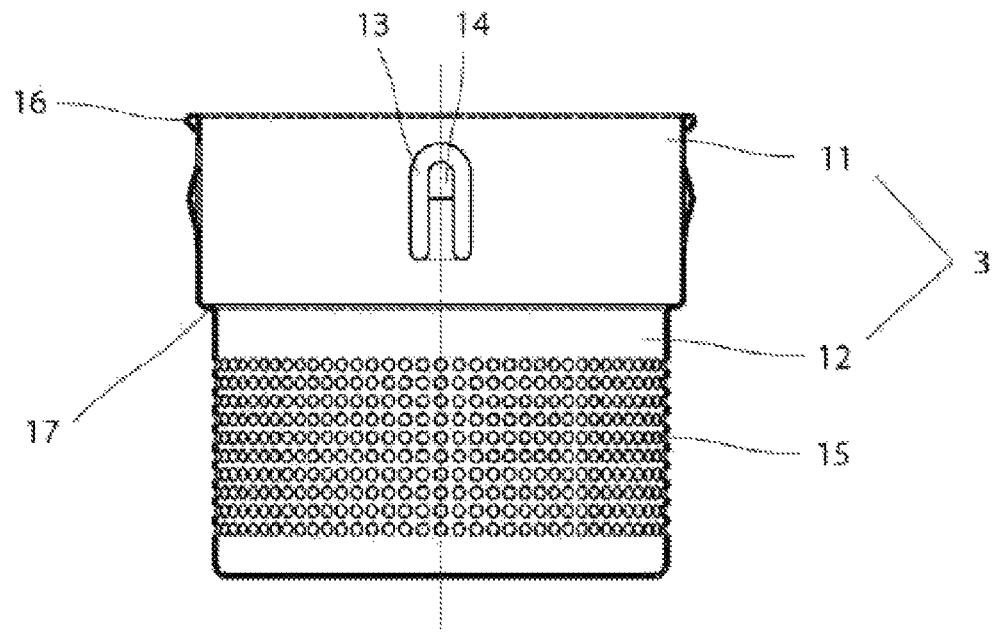
FIG. 9 is a schematic diagram of a filtering element structure of a tea drinking vacuum flask with a tea-making function of some embodiments of the present disclosure.

Referring to FIGS. 7 and 8, the liquid containing body 4 of the tea drinking vacuum flask with a tea-making function is provided with an outer shell 9 and an inner liner 10.

Figure 10:
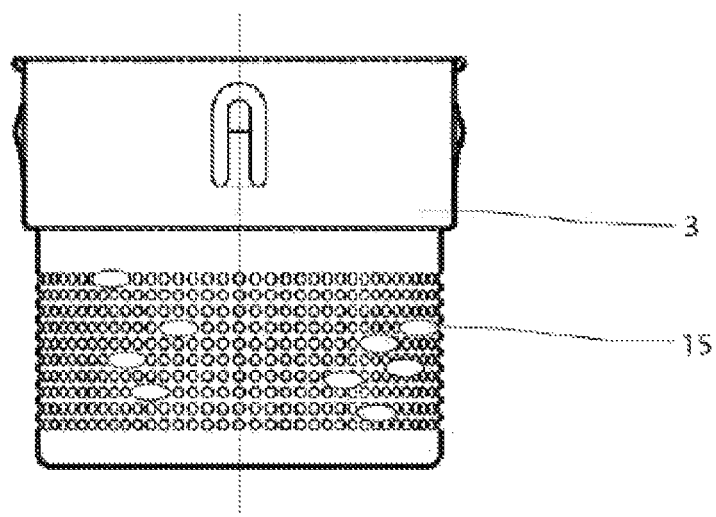
FIG. 10 is a schematic diagram of a filtering element structure of a tea drinking vacuum flask with a tea-making function of some more embodiments of the present disclosure.

Referring to FIG. 10, in some embodiments, a plurality of rows of the filtering holes 15 are arranged along the generatrix direction of the wall body of the filtering element 3, and the diameters of at least part of each row of the filtering holes 15 are different from each other, or the diameters of two rows of the filtering holes 15 are different from each other.

The diameters of part of each row of the filtering holes 15 are different from each other, so that the surface tension generated by the liquid flowing through the filtering holes 15 is different, and the upper space of the tea drinking vacuum flask with a tea-making function is less liable to be vacuum; and therefore, the probability that fluid is blocked due to vacuum is greatly reduced, and the service performance of the tea drinking vacuum flask with a tea-making function is optimized.

Figure 11:
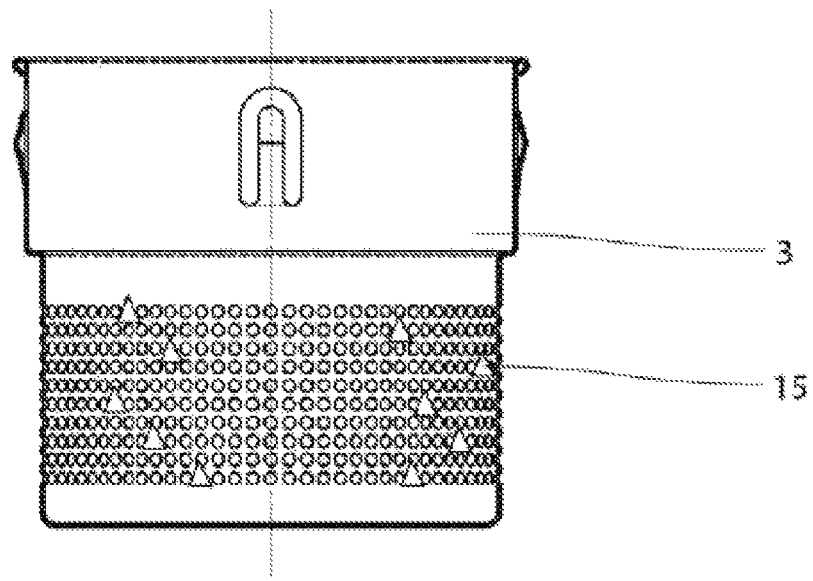
FIG. 11 is a schematic diagram of a filtering element structure of a tea drinking vacuum flask with a tea-making function of some other embodiments of the present disclosure.

Referring to FIG. 11, in some embodiments, a plurality of rows of the filtering holes 15 are arranged along the generatrix direction of the wall body of the filtering element 3, and the shapes of at least part of each row of the filtering holes 15 are different from each other. The sizes of the filtering holes 15 will affect the air pressure balance of the upper and lower parts of the filtering element 3 and the liquid flow rate. The sizes of the filtering holes 15 must be large enough to allow the air pressure to balance; and furthermore, the sizes of the filtering holes 15 should not be too large, because the poured tea leaves (broken tea leaves or whole tea leaves) will flow through the large filtering holes.

The shapes of part of each row of the filtering holes 15 are different from each other, and all the shapes are vary in characteristics, so that the surface tension generated by the liquid flowing through the filtering holes 15 is different, and the upper space of the tea drinking vacuum flask with a tea-making function is less liable to be vacuum; and therefore, the probability that fluid is blocked due to vacuum is greatly reduced, and the service performance of the tea drinking vacuum flask with a tea-making function is optimized.

Figure 12:
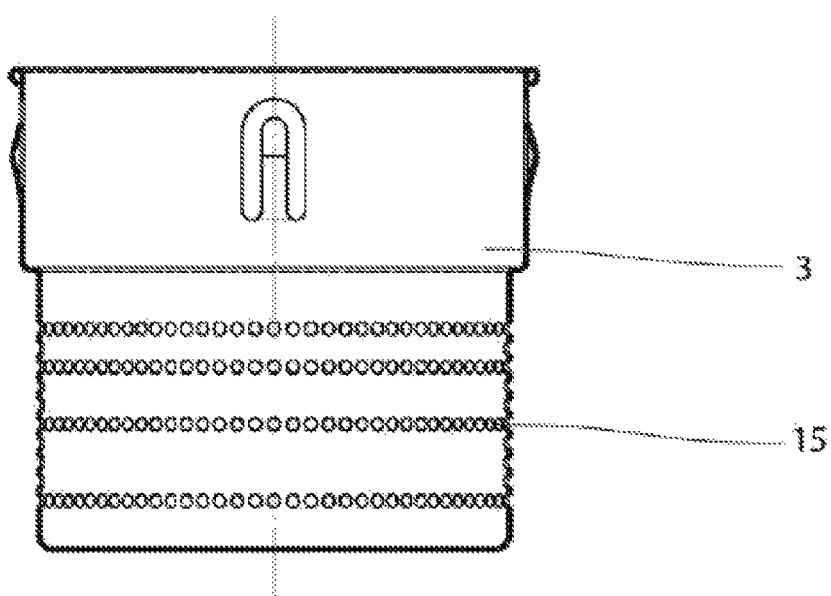
FIG. 12 is a schematic diagram of a filtering element structure of a tea drinking vacuum flask with a tea-making function of some other more embodiments of the present disclosure.

Referring to FIG. 12, in some embodiments, a plurality of rows of the filtering holes 15 are arranged along the generatrix direction of the wall body of the filtering element 3, and the spacing of two adjacent rows of filtering holes 15 is different. By changing the spacing of the filtering holes 51 arranged in rows, the probability of vacuum appearing at the upper part of the tea drinking vacuum flask with a tea-making function is reduced.

Figure 13:
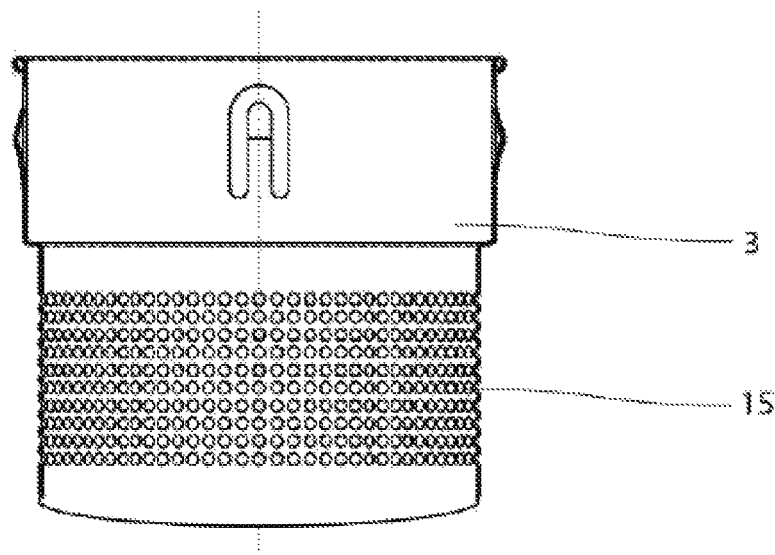
FIG. 13 is a schematic diagram of a filtering element structure of a tea drinking vacuum flask with a tea-making function of some more embodiments of the present disclosure.
Figure 14:
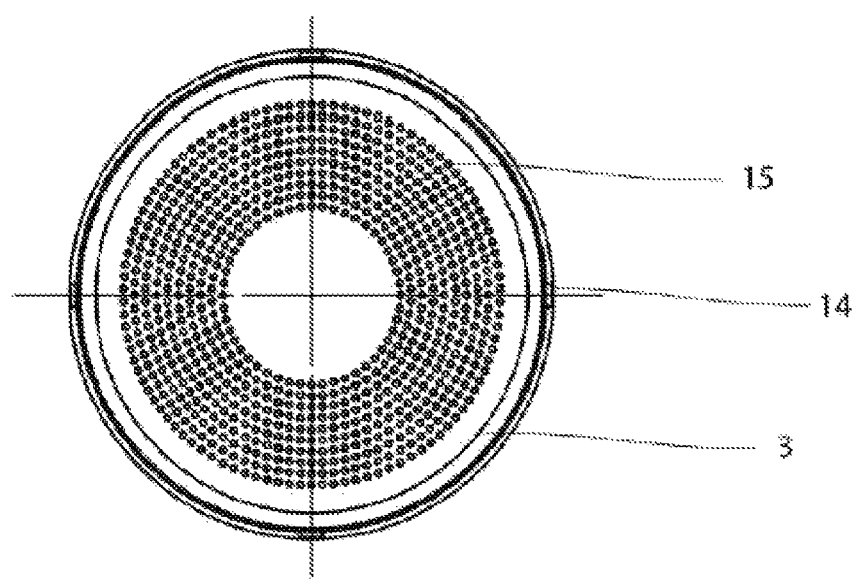
FIG. 14 is a schematic top view of a filtering element of some more embodiments of the present disclosure.

Referring to FIG. 13, in some embodiments, the bottom wall of the filtering element 3 is constructed to be convex towards the bottom wall of the tea drinking vacuum flask with a tea-making function. The shape of the bottom wall of the filtering element 3 adopts a non-plane structure, which can improve the shape of an upper cavity of the tea drinking vacuum flask with a tea-making function, so that tea leaves can be gathered at the lowest part of the recess, and liquid can easily flow through the filtering holes 15 without clogging.

In the above implementations, the depth of the recess of the filtering element 3 is greater than $\frac{1}{5}$ of the height of the tea drinking vacuum flask with a tea-making function. By adopting the design, the depth of the filtering element 3 is enabled to be large enough. Air mainly flows through the upper half part of the filtering element 3, and liquid mainly flows through the lower half part of the filtering element 3, so that air and liquid separation is realized, and the phenomenon that liquid cannot flow to the lower part of the tea drinking vacuum flask with a tea-making function due to liquid blockage caused by vacuum may be avoided.

In some embodiments, the depth of the recess of the filtering element 3 is $\frac{1}{30}$ to $\frac{1}{3}$ of the height of the tea drinking vacuum flask with a tea-making function, wherein $\frac{1}{25}$ to $\frac{1}{3}$ of the height is preferred, $\frac{1}{25}$ to $\frac{1}{5}$ of the height is more preferred, and $\frac{1}{20}$ to $\frac{1}{10}$ of the height is most preferred.

If the depth of the recess of the filtering element 3 is less than $\frac{1}{30}$ of the height of the tea drinking vacuum flask with a tea-making function, the filtering element 3 is easily blocked by solid tea leaves or other materials being soaked, and the separation effect of tea leaves and water is reduced.

If the depth of the recess of the filtering element 3 is more than $\frac{1}{3}$ of the height of the tea drinking vacuum flask with a tea-making function, tea leaves or other materials being soaked will be soaked in the liquid all the time, and the separation effect of the tea leaves and water cannot be reached. Therefore, the tea water will be taste bitter and astringent since the tea leaves are soaked for a too long time.

Figure 15:
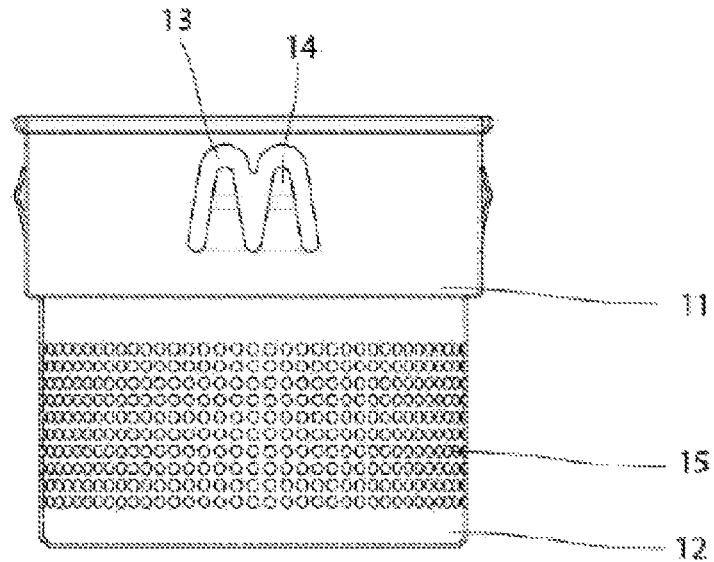
FIG. 15 is a schematic diagram of a filtering element structure of a tea drinking vacuum flask with a tea-making function of some other more embodiments of the present disclosure.

Referring to FIG. 15, the open slots 13 can also be constructed to be rectangular, wavy, and polygonal, thus having the advantages of better lightening the filtering element 3.

Figure 16:
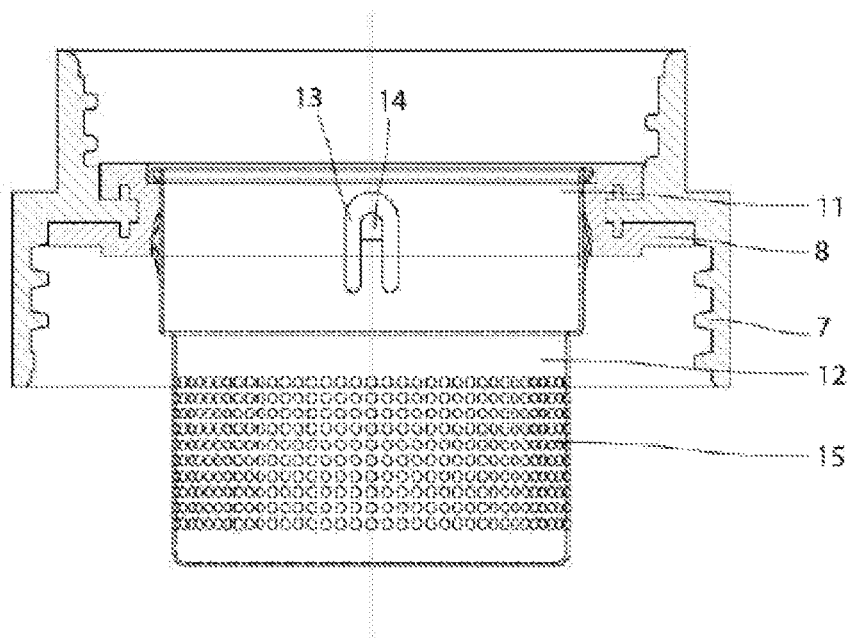
FIG. 16 is a schematic diagram of a connection relation between a filtering element and a water sealing part as well as an internal insert of a tea drinking vacuum flask with a tea-making function of some embodiments of the present disclosure.

Referring to FIG. 16, in various embodiments of the open slots 13 described above, in order to effectively make the air pass through the open slots 13 to achieve air balance, after the filtering element is assembled inside the connecting piece, part or all of the flow faces of any open slot 13 must exceed the edge of the water sealing part 8, and be exposed to the side, facing to the filtering holes 15, under the edge of the water sealing part 8.

Referring to FIG. 16, in some embodiments of the first part 11 of the filtering element, the depth of the recess of the first part 11 of the filtering element is greater than that of the water sealing part 8; and when the filtering element 3 is installed on the water sealing part 8, a bulge 16 of the first part of the filtering element is stuck in a top notch of the water sealing part 8, and part of the first part 11 of the filtering element protrudes from one side, facing the filtering holes 15, under the edge of the water sealing part 8.

Figure 17:
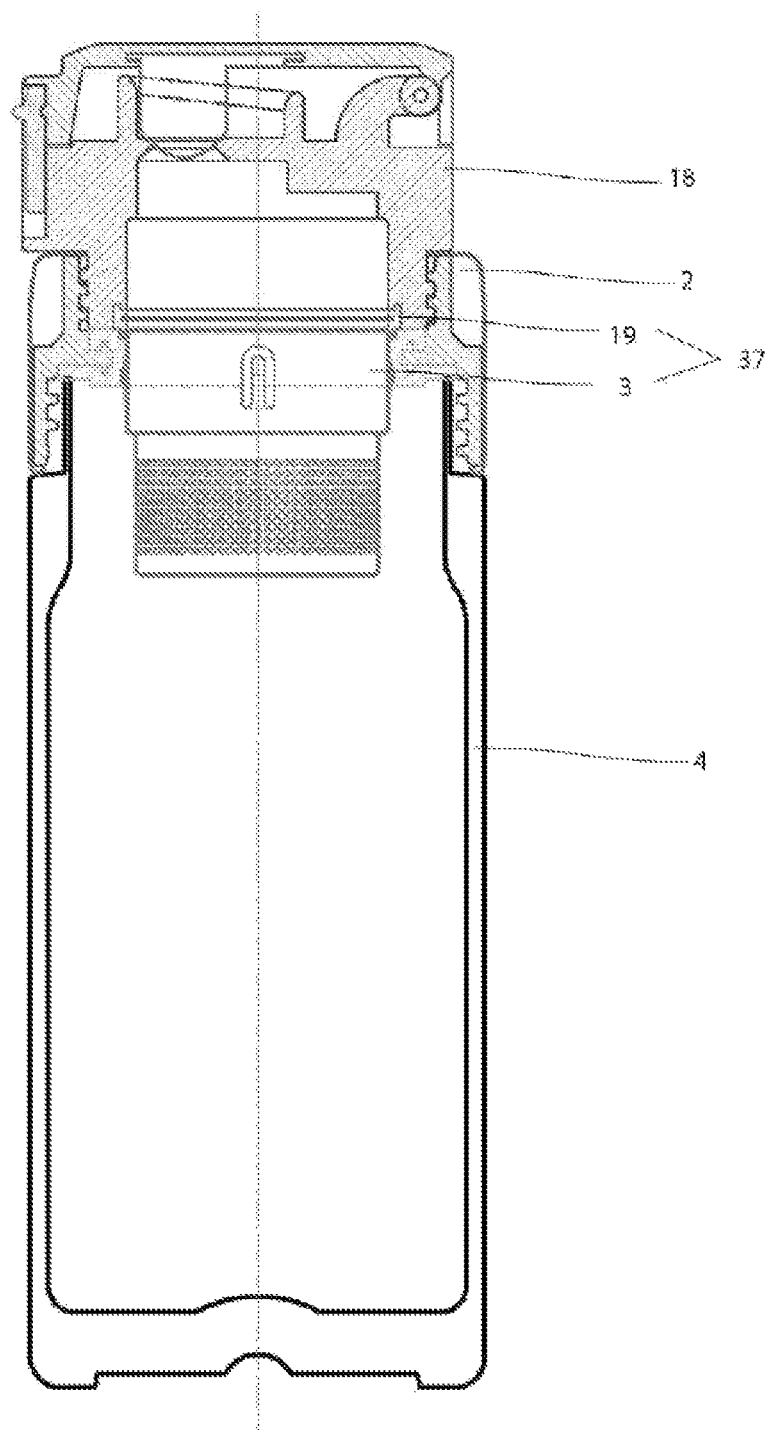
FIG. 17 is a schematic section view of a tea drinking vacuum flask with a tea-making function of some other embodiments of the present disclosure.
Figure 18:
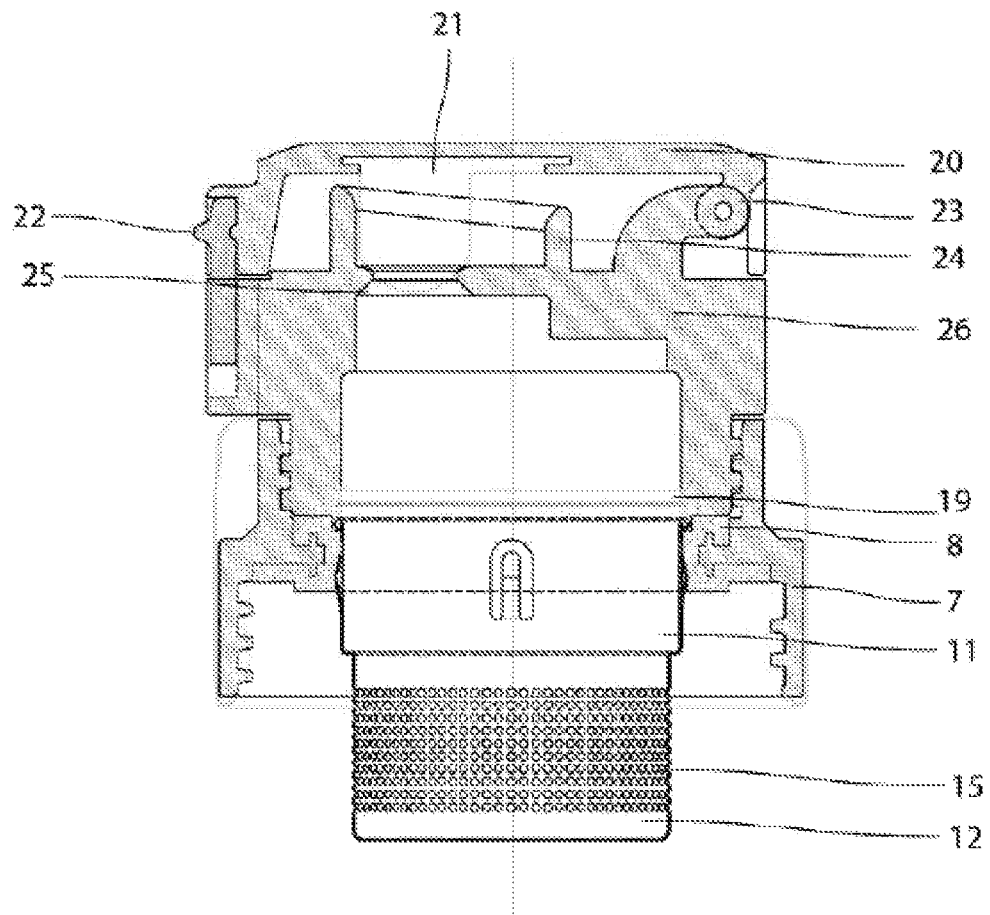
FIG. 18 is a schematic diagram of a connection relation between a filtering element and a water sealing part, an internal insert, a filter component as well as a flip lid of some embodiments of the present disclosure.

Referring to FIGS. 17 and 18, other implementations of the tea drinking vacuum flask with a tea-making function are described below. Other embodiments of the present disclosure provide a tea drinking vacuum flask with a tea-making function to unify the functions of making and drinking tea; and furthermore, solids such as tea leaves in a container will not enter the mouth of a drinker along with liquid while the drinker opens the vacuum flask with a single hand or drinks tea water with a single hand. The tea drinking vacuum flask with a tea-making function comprises a flip lid 18, a connecting piece 2, a filtering element 3, a liquid containing body 4, and a filter component 19, wherein the filter component 19 is installed at the bottom of the flip lid 18.

Referring to FIG. 18, the flip lid 18 is constructed to be openable, so that a user can drink the fluid in the tea drinking vacuum flask with a tea-making function by opening the flip lid 18. In some embodiments, the flip lid 18 comprises the filter component 19, an upper part 20 of the flip lid, a seal cover 21, an opening switch 22, and a lower part 26 of the flip lid.

The lower part 26 of the flip lid is provided with a through hole 25, and the upper half part of a drinking part 24 is inserted into the through hole 25 and protrudes from the through hole 25. A spring ring component 23 in the flip lid is arranged at the part where the upper part 20 of the flip lid is connected with the lower part 26 of the flip lid. The seal cover 21 is connected with the upper part 20 of the flip lid, and the seal cover 21 blocks the through hole 25 to prevent the liquid from flowing out when the flip lid 18 is closed. A ring-shaped recess part is formed by the edge of the interior of the through hole 25 of the lower part 26 of the flip lid, the top of the filter component 19 is detachably installed in the ring-shaped recess part, and the connecting piece 2 is connected with the flip lid 18 in a sealing way. By adopting the connecting way, the assembly and disassembly of the flip lid 18 and the liquid containing body 4 are facilitated.

The liquid containing body 4 is used as a container for containing beverages, materials being soaked, and water. The external shape of the liquid containing body 4 is not limited and can be arbitrary shapes such as a cylindrical shape, a rectangle, a hexagon, and an octangle. The top of the liquid containing body 4 is open, and the bottom end of the liquid containing body 4 is closed. The top of the liquid containing body 4 is provided with a connecting structure such as threads, and the liquid containing body 4 is connected with the connecting piece 2, the lid body 1, or the flip lid 18 in a sealing way by means of the connecting structure to prevent liquid leakage. The liquid containing body 4 is provided with an accommodating cavity in which water and tea leaves can be placed. Of course, in order to facilitate the drinking of beverages to be soaked, such as tea, the tea leaves can also be placed in a filter cavity 37 to be described later.

The filter cavity 37 is formed by the filtering element 3 and the filter component 19 which matches with each other. In some embodiments, the filter cavity 37 comprises a top wall, a side wall, and a bottom wall. The filtering element 3 serves as the bottom wall of the filter cavity 37, and the filter component 19 serves as the top wall of the filter cavity 37. The side wall of the filter cavity 37 can be formed by the filtering element 3 and the filter component 19 together or can be formed by the filter component 19 only. In some embodiments, the filter cavity 37 may also be formed by the filtering element 3, the filter component 19, and the inner side wall of the upper opening part of the liquid containing body 4 together. The solids to be soaked, such as the tea leaves and tea bags, are placed in the filter cavity 37. The filter cavity 37 is constructed to communicate with the liquid containing body 4 through the filtering holes 15 formed in the wall body of the filter cavity 37. If the filtering holes 15 are not considered, the filter cavity 37 is closed. In other words, with the exception of the filtering holes 15, there is no opening at the other parts of the filter cavity 37. Therefore, solid materials such as the tea leaves can be retained in the filter cavity 37. Unless the parts of the filter cavity are opened, the soaked materials will not leave the filter cavity 37 due to the inclination or inversion of the tea drinking vacuum flask with a tea-making function.

As described above, the filter cavity 37 is formed by the filtering element 3 and the filter component 19 together, and the filter cavity 37 can be openable. Before making tea, solids such as the tea leaves are firstly put into the filter cavity 37, and then the filter cavity 37 is sealed. In the subsequent tea drinking process, the solids are always retained in the filter cavity 37 and will not enter the liquid containing body 4.

The tea drinking vacuum flask with a tea-making function of the technical solution comprises the filtering element 3 and the filter component 19, and the filtering element 3 and the filter component 19 form the filter cavity 37. The filter cavity 37 has the function of allowing fluid to pass through and not allowing large solids such as the tea leaves to pass through, so that the tea drinking vacuum flask with a tea-making function has the functions of a tea-making utensil and a tea drinking utensil at the same time, and also has a function of preventing solids from entering the mouth of the drinker during drinking, so the use convenience of the tea drinking vacuum flask with a tea-making function is thus improved. In addition, the tea drinking vacuum flask with a tea-making function of the technical solution is suitable for hot and cold drinking occasions. After solids are loaded, other operations are not required in the drinking process, so the tea drinking vacuum flask with a tea-making function is especially suitable for one-handed drinking environments.

In some embodiments, the filtering element 3 adopts a separate structure. The filtering element 3 is detachably connected to at least one of the flip lid 18, the connecting piece 2, the liquid containing body 4, and the filter component 19. In multiple embodiments in which the filtering element 3 is detachably connected, since the filtering element 3 adopts a detachable connection, the filtering element 3 can be easily removed; and therefore, not only the bottom of the accommodating cavity and the filtering element 3 are easy to clean, but also the filtering elements 3 with different functions, effects, hole sizes, and filter screen depth specifications can be conveniently removed or replaced according to needs.

In some embodiments, the filter component 19 adopts a separate structure, and is detachably connected to at least one of the flip lid 18, the connecting piece 2, the liquid containing body 4, and the filtering element 3.

In some other embodiments, the filter component 19 is directly integrated with the flip lid 18.

In the embodiments of detachable connections between the filter component 19 and other components, since the filter component 19 adopts a detachable connection, the filter component 19 can be easily removed; and therefore, not only the bottom of the flip lid 18 and the filter component 19 are easy to clean, but also the filter component 19 with different functions, effects, and hole size specifications can be conveniently replaced according to needs.

According to the technical solution, the filtering element 3 and the filter component 19 form the filter cavity 37, and the filtering holes 15 of the filter cavity 37 have a filtering function. According to needs, the tea leaves or other materials being soaked or materials that have been soaked are retained inside the filter cavity 37 without entering the accommodating cavity.

In some embodiments, both the filtering element 3 and the filter component 19 are provided with filtering holes 15, and the filtering holes 15 are constructed to block solids and allow fluid to pass through. That is to say, the filtering holes 15 can be formed in all the walls of the filter cavity 37, so that the probability that the tea leaves block the filtering holes 15 can be reduced, fluid can pass through the filtering holes 15 smoothly, and the convenience of drinking can be further improved.

The filtering holes 15 of both the filtering element 3 and the filter component 19 can adopt the following various structures. In some embodiments, the cross-sectional shapes of the filtering holes 15 comprise at least one of the following: a herringbone shape, a circle, a slit shape, and a rectangle. The so-called herringbone shape means that there are three slits, and one ends of the three slits converge. After the filtering holes 15 having the herringbone structure are adopted, even if the sizes of the filtering holes 15 are small, fluid can easily pass through without causing liquid adsorption at the filtering holes 15. The circular filtering holes 15 are convenient for processing and manufacturing. The slit-shaped filtering holes 15 are convenient for processing and manufacturing and have a high fluid passage rate. The rectangular filtering holes 15 are convenient for processing and manufacturing.

The formation of the filter cavity 37 is described in the following embodiments. According to different installation and connection methods of the filtering element 3 and the filter component 19, there are the following methods. The first method is: the filtering element 3 and the filter component 19 are detachably installed together, and then integrally installed on the flip lid 18. The second method is: the filtering element 3 and the filter component 19 are detachably installed together, and then integrally installed in the liquid containing body 4. The third method is: the filtering element 3 and the filter component 19 are detachably installed together, and then integrally installed on the connecting piece 2. The fourth method is: the filtering element 3 and the liquid containing body 4 are installed together, and the filter component 19 and the flip lid 18 are installed together. After the flip lid 18 and the connecting piece 2 are installed together, the filtering element 3 and the filter component 19 are combined to form the filter cavity 37.

In the various embodiments described above, the filtering element 3 and the filter component 19 are detachably connected by means of threads, in a buckling way, or the like. Both the filtering element 3 and the filter component 19 are constructed to be recessed, the depth of the recess of the filtering element 3 is greater than the depth of the recess of the filter component 19, and the recessed direction of the filtering element 3 can be the same as or opposite to the recessed direction of the filter component 19. Specifically, for example, the filtering element 3 is sunken towards the bottom of the liquid containing body 4, and the filter component 19 is sunken towards the bottom of the liquid containing body 4; and the structure not only has a relatively large space for placing solids but is also convenient to install. Alternatively, the filtering element 3 is sunken towards the bottom of the liquid containing body 4, and the filter component 19 is sunken towards the flip lid 18. With this structure, the total depth of the filter cavity 37 is the sum of the depth of the filtering element 3 and the depth of the filter component 19, so that there is more space for placing solids. Alternatively, the filtering element 3 is constructed to be flat, the filter component 19 is configured to be recessed, and the filtering element 3 is located at the opening of the filter component 19.

It is understandable that by reasonably setting the positions of male and female threads, the detachable and sealed connection between the flip lid 18 and the connecting piece 2 or the liquid containing body 4 can be realized. By reasonably setting the positions of the male and female threads, the detachable connection between the filtering element 3 and the filter component 19 can also be realized.

In some embodiments, the connecting piece 2 and the lid body 1 are integrally constructed.

In some embodiments, the connecting piece 2 and the flip lid 18 are integrally constructed.

In some embodiments, the connecting piece 2 and the liquid containing body 4 are integrally constructed.

In some embodiments, the filtering element 3 is made of one of the following materials: stainless steel, plastic, glass, ceramic, and other metals.

In some embodiments, the filter component 19 is made of one of the following materials: stainless steel, plastic, glass, ceramic, and other metals.

In some embodiments, the liquid containing body 4 is made of a transparent material.

In some embodiments, the liquid containing body 4 is made of one of the following materials: stainless steel, plastic, glass, ceramic, silica gel, and wood.

In some embodiments, the wall of the liquid containing body 4 is constructed to be double-layer hollow or multi-layer hollow.

In some embodiments, the capacity of the liquid containing body 4 is 150 ml to 1000 ml. It is preferably 200 ml to 1000 ml, more preferably 250 ml to 900 ml, and most preferably 300 ml to 800 ml.

The use process of the tea drinking vacuum flask with a tea-making function is as follows.
  (i) The use process of the tea drinking vacuum flask with a tea-making function which is provided with a sealed lid body 1 is as follows:

the first method comprises the steps of putting a material to be soaked into the filtering element 3 that has been placed in the connecting piece 2; connecting the lid body 1 to the connecting piece 2; pouring an appropriate amount of water or hot water into the liquid containing body 4; and tightening the lid body 1 and the connecting piece 2 in which the filtering element 3 has been installed, and soaking upside down. When a drinker thinks that the liquid containing the soaked material has a suitable taste, the entire vacuum flask is turned upright. At this time, the drinker can drink through the opening of the liquid containing body 4. The method is suitable for materials that have a soaking time limit and should not be soaked for too long. The proper amount of the poured water in this method means that the amount of the poured water does not reach the bottom of the filtering element 3, so that the soaking is carried out in an inverted position, and the water or hot water will sink and leave the soaked material when the vacuum flask stands upright.

The second method comprises the steps of putting a material to be soaked into the liquid containing body 4; pouring an appropriate amount of water or hot water into the liquid containing body 4; and tightening the lid body 1 and the connecting piece 2 in which the filtering element 3 has been installed. When thinking that the liquid containing the soaked material has a suitable taste, a drinker can disassemble the lid body 1, and pour the liquid from the liquid containing body 4 into the lid body 1 or other cups, for drinking, through the connecting piece 2 in which the filtering element 3 has been installed.

(ii) The use process of the tea drinking vacuum flask with a tea-making function which is provided with an openable flip lid 18 is as follows.

The first method comprises the steps of putting a material to be soaked into the filtering element 3 that has been placed in the connecting piece 2; connecting the flip lid 18 to the connecting piece 2; pouring an appropriate amount of water or hot water into the liquid containing body 4; and tightening the flip lid 18 and the connecting piece 2 in which the filtering element 3 has been installed, and soaking upside down. When a drinker thinks that the liquid containing the soaked material has a suitable taste, the entire vacuum flask is turned upright. At this time, the drinker can drink through the opening of the flip lid. The method is suitable for materials that have a soaking time limit and should not be soaked for too long. The proper amount of the poured water in this method means that the amount of the poured water does not reach the bottom of the filtering element 3, so that the soaking is carried out in an inverted position, and the water or hot water will sink and leave the soaked material when the vacuum flask stands upright. The user can open the flip lid 18 with one hand to drink, which makes the operation very convenient.

The second method comprises the steps of putting a material to be soaked into the liquid containing body 4; pouring an appropriate amount of water or hot water into the liquid containing body 4; and tightening the flip lid 18 and the connecting piece 2 in which the filtering element 3 has been installed. When thinking that the liquid containing the soaked material has a suitable taste, a drinker can open the flip lid 18 with one hand to drink.

In the description of the embodiments of the present disclosure, it should be understood that the terms "center," "longitudinal direction," "horizontal direction," "front," "rear," "left," "right," "vertical," "horizontal," "top," "bottom," "interior," "exterior," and other indicated orientations or position relations are based on the orientations or position relations shown in the drawings, and are only for the convenience of describing the embodiments of the present disclosure and simplifying the description, rather than indicating or implying that the devices or elements referred to must have specific orientations, or be constructed and operated in the specific orientations, and therefore, it cannot be understood as a limitation on the protected content of the embodiments of the present disclosure.

Finally, it should be noted that the above embodiments are only used to illustrate the technical solution of the present disclosure, but not to limit it; although the present disclosure is described in detail with reference to the embodiments, those of ordinary skill in the art should understand that the technical solutions described in the embodiments can still be modified, or some of the technical features therein can be equivalently replaced; however, these modifications or replacements do not cause the essence of the corresponding technical solutions to deviate from the spirit and scope of the technical solution of the embodiments of the disclosure.

What is claimed is:

1. A tea drinking vacuum flask with a tea-making function, the tea drinking vacuum flask comprising:
   a lid body which comprises a first end and a second end arranged opposite to the first end;
   a connecting piece which comprises a channel, wherein the channel comprises a first connection end and a second connection end, and wherein the first connection end is detachably connected with the second end, wherein a water sealing part is detachably fixed at a protruding part of the connecting piece;
   a filtering element which comprises a first part and a second part which are fixedly connected with each other, wherein the first part is positioned at the end, facing the lid body, of the second part; wherein open slots are formed in the first part, filtering holes are formed in the second part; and the filtering element is detachably connected with the connecting piece, wherein with the filtering element assembled to the connecting piece, the open slots are positioned such that at least a portion of the flow area of the open slots allow for air flow through the open slots around the water sealing part to achieve air balance; and
   a liquid containing body which is detachably connected with the second connection end of the connecting piece.

2. The tea drinking vacuum flask with a tea-making function according to claim 1, wherein the shapes of the open slots are selected from one or more of the following shapes: a circle, a U shape, an oblong shape, a herringbone shape, a rectangle, a wavy shape, and a polygon.

3. The tea drinking vacuum flask with a tea-making function according to claim 1, wherein flow areas of the open slots are different from flow areas of the filtering holes, wherein a flow area of a respective open slot is greater than a flow area of a respective filtering hole.

4. The tea drinking vacuum flask with a tea-making function according to claim 1, wherein elastic clamp holders are arranged on the outer wall of the first part of the filtering element.

5. The tea drinking vacuum flask with a tea-making function according to claim 4, wherein the elastic clamp holders are constructed to be arcuate bulges.

6. The tea drinking vacuum flask with a tea-making function according to claim 4, wherein the elastic clamp holders are defined within the open slots such that each open slot includes a respective elastic clamp holder.

7. The tea drinking vacuum flask with a tea-making function according to claim 6, wherein the elastic clamp holders are constructed to be arcuate bulges bulging radially outward from the first part of the filtering element.

8. The tea drinking vacuum flask with a tea-making function according to claim 6, wherein, the filtering element is detachably connected with the connecting piece, wherein the elastic clamp holders are configured to extend radially outward from the first part of the filtering element and abut an inner diameter portion of the connecting piece to hold the filtering element within the connecting piece.

9. The tea drinking vacuum flask with a tea-making function according to claim 8, further comprising a water sealing part included on the inner diameter portion of the connecting piece, wherein the elastic clamp holders are configured to extend radially outward from the first part of the filtering element and abut into the water sealing part.

10. The tea drinking vacuum flask with a tea-making function according to claim 1, wherein at least one open slot is formed along the circumferential direction of the first part of the filtering element.

11. The tea drinking vacuum flask with a tea-making function according to claim 1, wherein the diameter of the first part of the filtering element is greater than that of the second part of the filtering element.

12. The tea drinking vacuum flask with a tea-making function according to claim 1, wherein a plurality of rows of the filtering holes are formed along the generatrix direction of the wall body of the filtering element.

13. The tea drinking vacuum flask with a tea-making function according to claim 1, wherein the lid body comprises:
 a flip lid; and
 a filter component arranged at the bottom of the flip lid.

14. The tea drinking vacuum flask with a tea-making function according to claim 1, wherein
 the connecting piece is integrated with one of the lid body and the liquid containing body, and/or
 the liquid containing body comprises an outer shell and an inner liner fixed in the outer shell; and/or, the first part is integrated or detachably connected with the second part.

15. The tea drinking vacuum flask with a tea-making function according to claim 14, wherein with the filtering element assembled to the connecting piece, the open slots are positioned such that at least a portion of the flow area of the open slots are positioned above a lower edge of the water sealing part and are below the filter component.

16. The tea drinking vacuum flask with a tea-making function according to claim 1, wherein with the filtering element assembled to the connecting piece, the open slots are positioned such that at least a portion of the flow area of the open slots are positioned above a lower edge of the water sealing part, wherein the water sealing part includes a silicone or silica-based water sealing part.

17. A tea drinking vacuum flask with a tea-making function, the tea drinking vacuum flask comprising:
 a lid body which comprises a first end and a first threaded end arranged opposite to the first end;
 a connecting piece which comprises a channel, wherein the channel comprises a first connection end and a second connection end, and the first connection end is detachably connected with the first threaded end;
 a filtering element which comprises a first part and a second part which are fixedly connected with each other, wherein the first part is positioned at the end, facing the lid body, of the second part; wherein open slots are formed in the first part, filtering holes are formed in the second part, and flow areas of the open slots are different from flow areas of the filtering holes; and
 a liquid containing body which is detachably connected with the second connection end of the connecting piece,
  wherein elastic clamp holders are arranged on the outer wall of the first part of the filtering element, wherein the elastic clamp holders are defined within the open slots such that each open slot includes a respective elastic clamp holder.

18. The tea drinking vacuum flask with a tea-making function according to claim 17, wherein the elastic clamp holders are constructed to be arcuate bulges bulging radially outward from the first part of the filtering element.

19. The tea drinking vacuum flask with a tea-making function according to claim 17, wherein, the filtering element is detachably connected with the connecting piece, wherein the elastic clamp holders are configured to extend radially outward from the first part of the filtering element and abut an inner diameter portion of the connecting piece to hold the filtering element within the connecting piece.

20. The tea drinking vacuum flask with a tea-making function according to claim 19, further comprising a water sealing part included on the inner diameter portion of the connecting piece, wherein the elastic clamp holders are configured to extend radially outward from the first part of the filtering element and abut into the water sealing part.

\* \* \* \* \*